United States Patent [19]

Iwamoto et al.

[11] Patent Number: 5,940,574
[45] Date of Patent: Aug. 17, 1999

[54] AUDIO AND VIDEO DATA RECORDING AND REPRODUCTION USING TRACK ID DATA

[75] Inventors: Tetsuya Iwamoto; Hiroshi Inamura, both of Kanagawa, Japan

[73] Assignee: Sony Corporation, Tokyo, Japan

[21] Appl. No.: 08/815,918

[22] Filed: Mar. 13, 1997

[30] Foreign Application Priority Data

Mar. 21, 1996 [JP] Japan .................................. 8-064172

[51] Int. Cl.[6] .................................................. H04N 5/95
[52] U.S. Cl. ............................ 386/87; 386/88; 386/95; 360/27; 360/77.12
[58] Field of Search .................................... 386/14, 23, 74, 386/78, 79, 80, 86, 88, 111, 112, 87; 360/76, 77.01, 77.12, 77.14, 77.15, 27, 48

[56] References Cited

U.S. PATENT DOCUMENTS

| | | | |
|---|---|---|---|
| 4,255,768 | 3/1981 | Kubota | 360/10 |
| 4,772,963 | 9/1988 | Van Lahr et al. | 360/47 |
| 5,282,049 | 1/1994 | Hatakenaka et al. | 358/76 |
| 5,751,889 | 5/1998 | Van Gestel et al. | 386/68 |

*Primary Examiner*—Wendy Garber
*Assistant Examiner*—Christopher Onuaku
*Attorney, Agent, or Firm*—Frommer Lawrence & Haug, LLP; William S. Frommer

[57] ABSTRACT

A recording system adds a track identification (ID) data for identifying each of the slant tracks, in units of GOP, on a tape during the recording of compressed video and audio data. A tape transport is controlled as a function of a longitudinal control signal recorded on a longitudinal track of the tape if a playback control head can normally reproduce the control signal. If, however, the playback control head cannot reproduce the longitudinal control signal, the tape transport is controlled as a function of a slant control signal containing the track ID data previously recorded on the tape. Hence, the tape transport is accurately maintained even if a problem occurs with the playback control head.

13 Claims, 7 Drawing Sheets

AUDIO AND VIDEO DATA RECORDING AND REPRODUCTION USING TRACK ID DATA

BACKGROUND OF THE INVENTION

The invention is related to audio and video data recording and reproduction and, in particular, an apparatus and method for controlling a tape transport based on a previously recorded control signal, which is reproduced from a longitudinal track or, alternatively, based on a previously recorded track number, which is reproduced from a slant track.

To eliminate guard-bands thereby achieving more recording area on a tape in a video tape recorder (VTR), the azimuth angles are alternated for the adjacent slant tracks on which audio and video data is recorded. If, due to crosstalk or misalignment, a slant track is erroneously scanned or traced by a helical-type playback head employing a different azimuth angle, the audio and video data on that track is not reproduced, as it should not be.

This no-guard band arrangement, however, requires tight tracking control for maintaining accurate data reproduction. If the playback head and the slant track of the same azimuth angle deviate from each other, many errors may occur during the reproduction of audio and video data.

One type of the tracking control has been proposed in a VTR using a so-called non-tracking system. The VTR with the non-tracking system has two playback heads, each having a positive azimuth angle (hereinafter referred to as positive azimuth heads) and spaced apart by one track pitch along the width of a tape surface. Further, the VTR has two additional playback heads. Each of these additional playback heads has a negative azimuth angle (hereinafter referred to as negative azimuth heads) and is also arranged at an interval of one track pitch. The negative azimuth heads may be symmetrically positioned, with respect to the center of a drum, across from the positive azimuth heads.

In the VTR equipped with such non-tracking system, the slant tracks are scanned by the four playback heads for reading the audio and video data. Initially, the received audio and video data is processed in order to detect and correct errors using an inner parity code. Next, a priority is given to the data with no errors, after the error correction processing, as opposed to the audio and video data in which errors cannot be corrected. The error-corrected data is then stored in a VTR memory. Further, the audio and video data is error-corrected using an outer parity code. Similarly, the audio and video data having the least number of errors is output. Hence, by selecting the best audio and video data between the two positive (and negative) azimuth heads, requirements for accurately controlling the tracking of a slant track by the playback heads are greatly relaxed. It then becomes possible to record audio and video data without scanning a helical track already existing on the tape (a so-called underlying track).

In addition, a track is typically provided along the longitudinal direction of the tape. In another type of tracking control in a general VTR, when the audio and video data is recorded on the slant tracks of the tape, the control signal is simultaneously recorded on the control track by a separate control head. When the audio and video data is reproduced from the slant tracks, the control signal is also reproduced from the control track by the control head. Accurate data reproduction from the tape is thereby achieved as a function of the tracking control, due to the reproduced control signal, by either accelerating or decelerating the tape transport.

However, when the control head performing the recording and reproduction of the control signal from the longitudinal track of the tape becomes unusable due to clogging (i.e., head clogging), for example, the tape transport cannot be controlled. Consequently, data is either reproduced incorrectly or not reproduced at all.

Furthermore, a particular position at which the control signal is recorded may not coincide with the corresponding recording position of the audio and video data due to various causes, such as an error in the tape transport system, the stretching or shrinkage of the tape, etc. In such a case, if transporting of the tape is based on the control signal, for example, when the audio and video data compressed and coded in units of GOP (group of pictures) is reproduced by the MPEG (Motion Picture Experts Group) system, it is possible that the audio and video data near the GOP boundaries can no longer be correctly reproduced.

Even in a VTR employing the non-tracking system as described above, the scanning direction of the reproducing head may diverge from the direction of the slant track itself due to lack of control of the tape transport as used in a general VTR. When this occurs, the audio and video data will no longer be properly reproduced by the VTR with the non-tracking system.

A need therefore exists for an apparatus and method that overcome the above disadvantages.

OBJECTS OF THE INVENTION

It is an object of the invention to accurately reproduce audio and video data in a video tape recorder.

It is another object of the invention to control a tape transport in a video tape recorder.

It is a further object of the invention to accurately reproduce audio and video data by controlling a tape transport in a video tape recorder with a non-tracking system.

It is still another object of the invention to accurately reproduce audio and video data by controlling a tape transport in a video tape recorder even when a control signal recorded on a longitudinal track of the tape cannot be used for tracking control.

It is yet another object of the invention to control a tape transport in a video tape recorder by using either a control signal recorded on a longitudinal track or track identification (ID) data recorded, along with audio and video data, on slant tracks of the tape.

SUMMARY OF THE INVENTION

These and other objects, features and advantages are accomplished, in accordance with one aspect of the invention, by an apparatus for recording and reproducing audio and video data on a tape having a plurality of slant tracks and a longitudinal track. The inventive apparatus comprises the following: means for generating an error control code which is added to the audio and video data to produce encoded audio and video data; means for generating track identification (ID) data, corresponding to each slant track, which is added to the encoded audio and video data to control a transport of the tape; means for recording the encoded audio and video data along with the track ID data on the slant tracks; means for generating a control signal which is recorded on the longitudinal track such that the control signal is used to control the transport of the tape; means for reproducing the encoded audio and video data and the track ID data from the slant tracks; means for correcting errors in the encoded audio and video data using the error control code; means for reproducing the control signal from the longitudinal track; and means for controlling the transport of the tape as a function of one of the control signal and the track ID data.

In accordance with one aspect of the invention, further included is means for dividing the audio and video data into a plurality of data units such that each data unit is a group of pictures (GOP).

In accordance with another aspect of the invention, the inventive apparatus further comprises means for generating a track number for each track within each GOP such that the track ID data includes the track number.

In accordance with yet another aspect of the invention, also included is means for detecting the track number in the encoded audio and video data. The transport of the tape is controlled as a function of the track number if the control signal cannot be reproduced from the longitudinal track.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which.

In all Figures, like reference numerals represent the same or identical components of the invention.

DETAILED DESCRIPTION OF THE PREFERRED EMBODIMENTS

The invention will now be explained in detail with reference to the accompanying drawings. By way of an example, audio and video data of the NTSC video format (525 lines/60 Hz) is used in describing the invention.

Figure 1:
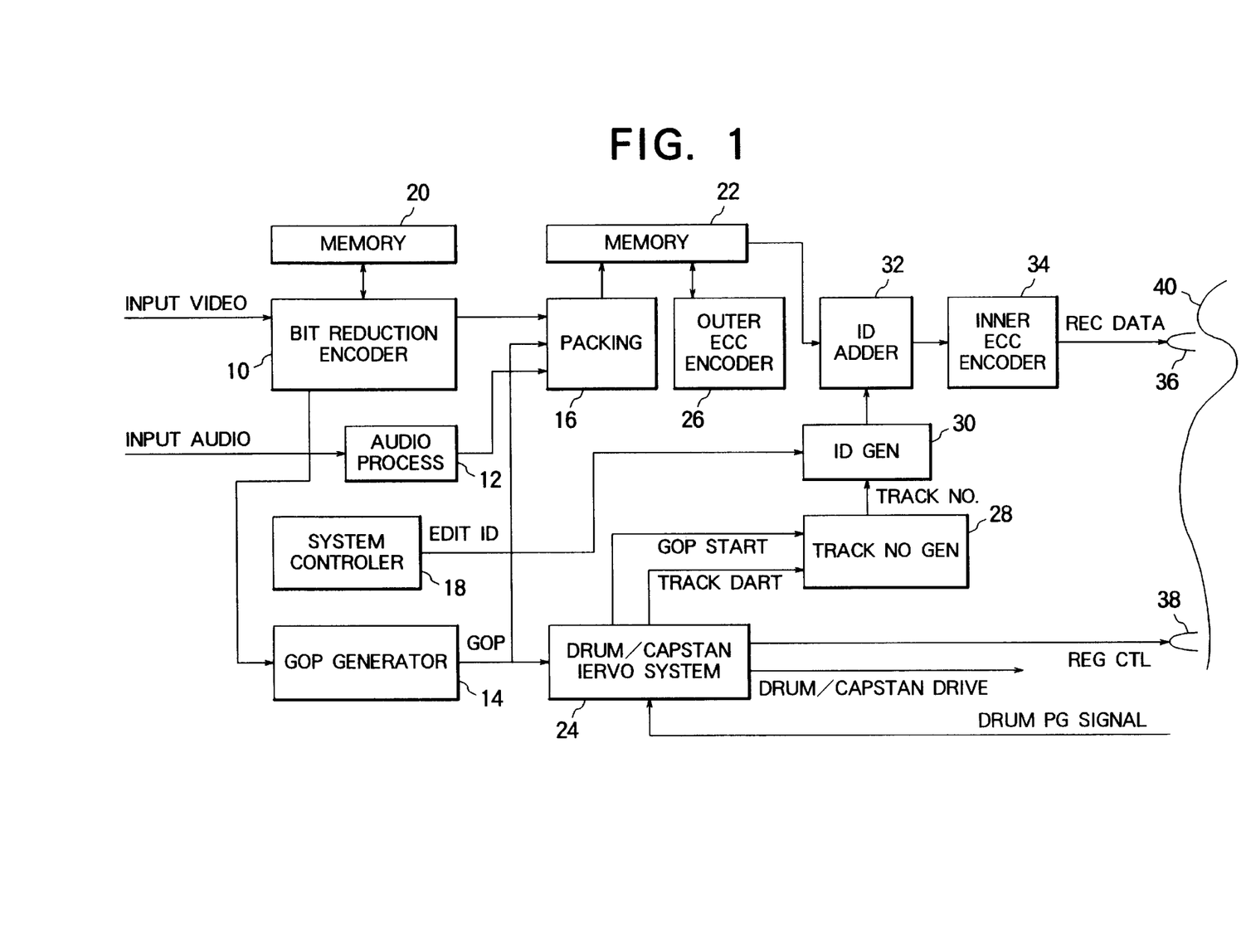
FIG. 1 is a block diagram of a recording and reproducing apparatus during a recording operation according to the present invention.

FIG. 1 shows a recording operation of a recording and reproducing apparatus according to the present invention. Initially, video data from an external video processing device is input to a bit reduction encoder 10. The video data bits are reduced (compressed) by an encoding method using a memory 20. After the compression, the video data is supplied to the packing circuit 16. The compressed video data is also supplied to a GOP generator 14. The GOP generator 14 generates a GOP signal indicating the boundaries among the GOPs in the compressed video data. The boundary determination by the GOP generator 14 is based on the operational timing of the bit reduction encoder 10. The output of the GOP generator 14 is provided to the packing circuit 16 and a drum/capstan servo system 24.

An audio processor 12 performs a delay operation or, alternatively, a compressing and coding operation, on the audio data and outputs the processed data to the packing circuit 16.

Figure 3:
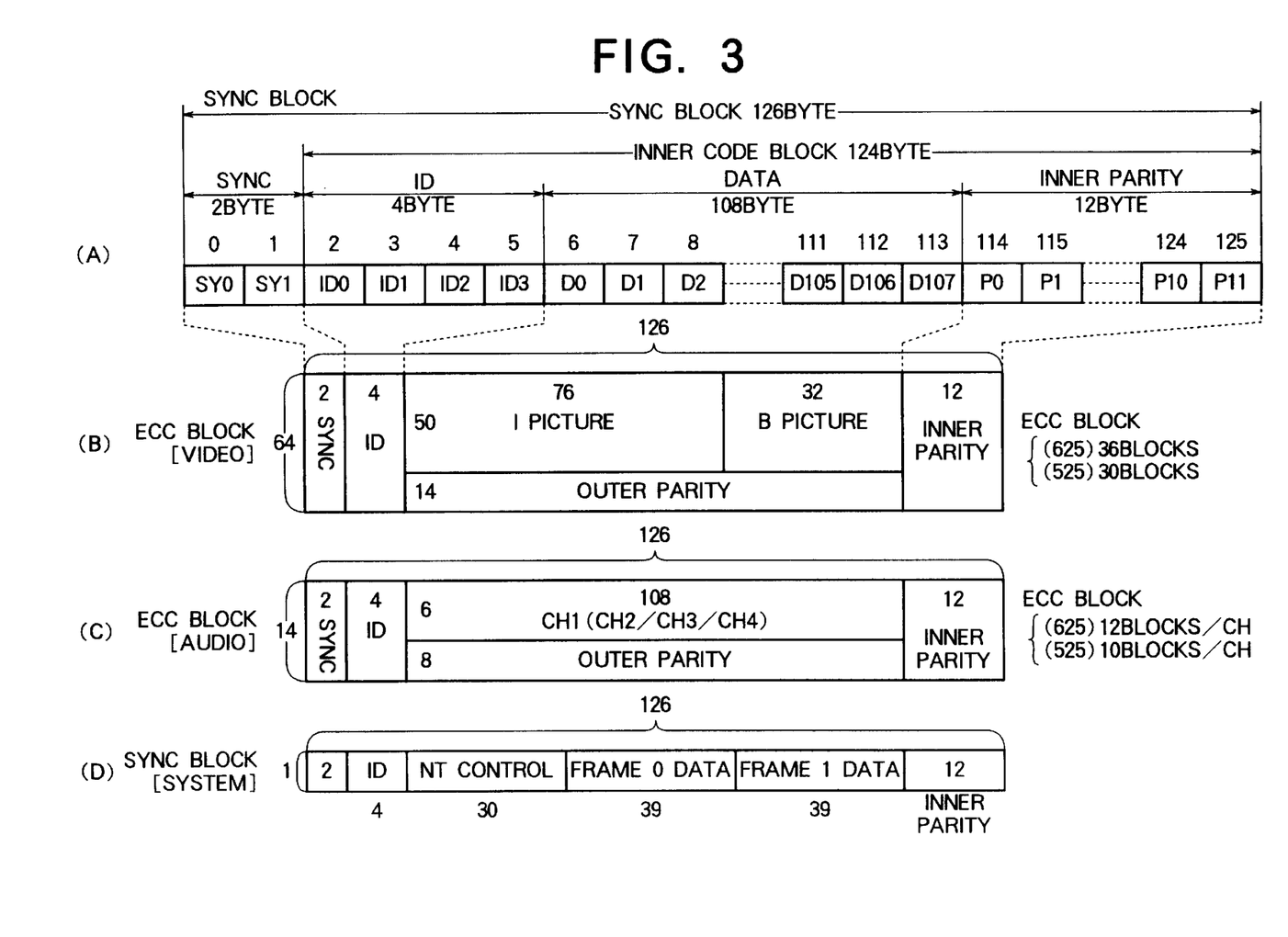
FIG. 3 is a diagram of a synchronization block (SYNC BLOCK)

Next, the packing circuit 16 assembles the GOP signal, the audio data supplied from the audio processor 12 and the compressed video data into a recording format which includes synchronization blocks (SYNC BLOCK) as shown in detail in FIG. 3. The packing operation is carried out using a memory 22 to generate the packed audio and video data which is then stored back in the memory 22.

Following the packing operation, an outer Error Control Coding (ECC) encoder 26 generates an outer parity code, as also shown in FIG. 3, by fetching the packed audio and video data from the memory 22 and adding the appropriate codes.

Next, track identification (ID) data is added to the ECC encoded data by an ID adder 32. This is accomplished by reading the audio and video data, encoded by outer ECC codes, from the memory 22 and adding the track ID data, which will be explained in detail hereinbelow, to the outer ECC encoded data. Further, the ID adder 32 appends the system data which is used for the system control of the recording and reproducing apparatus, as shown in FIG. 3D. The resulting data is output to an inner Error Control Coding (ECC) encoder 34.

Figure 4:
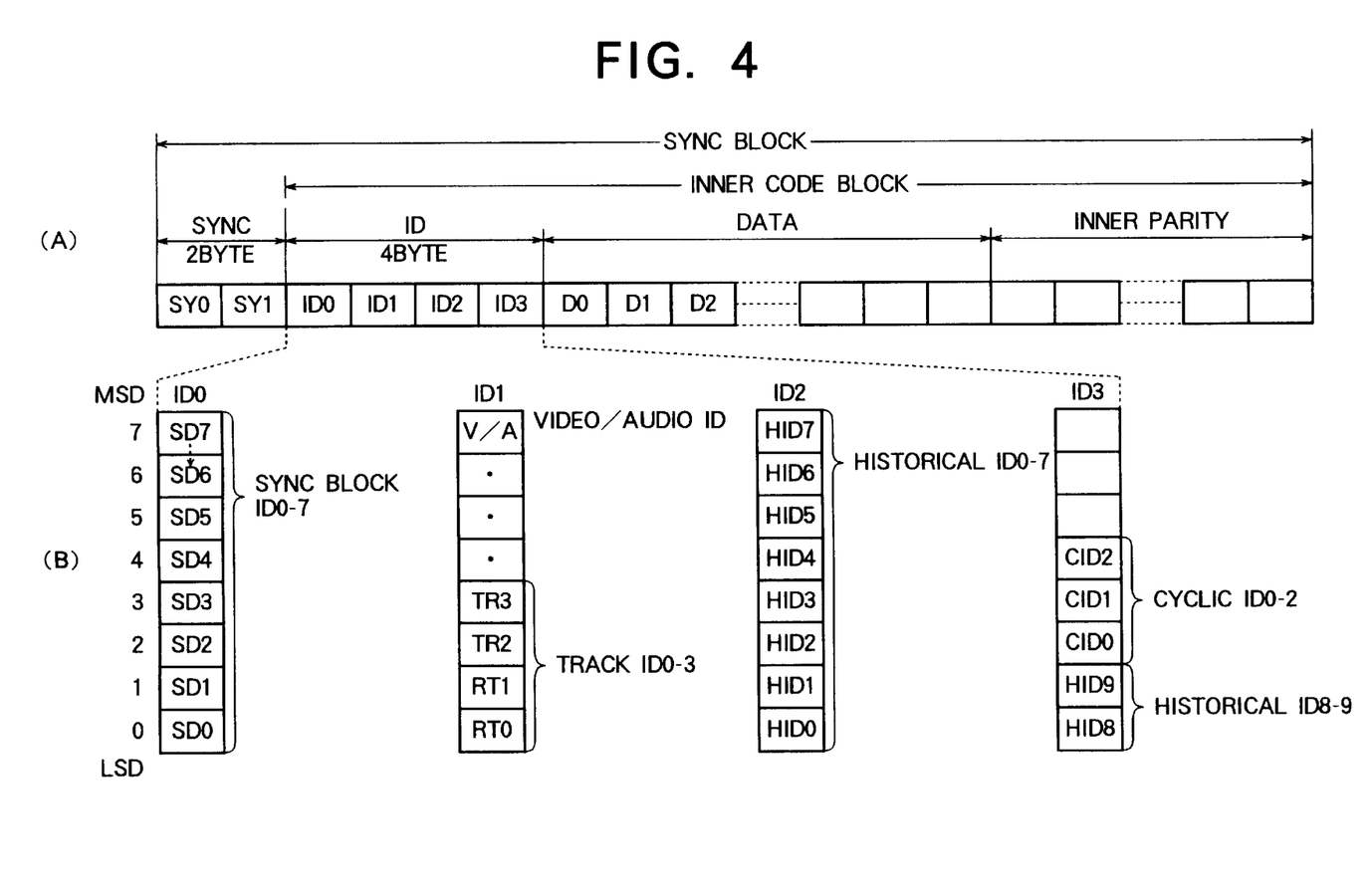
FIG. 4 is a detailed diagram of the track ID data in the synchronization block (SYNC BLOCK)

An ID generator 30 generates the track ID data, shown in FIG. 4, based on the track number supplied from a track number generator 28 and edit ID data (EDIT ID) which is input from a system controller 18 indicating the contents of the edit processing. A track number is generated by the track number generator 28 which receives two signals from the drum/capstan servo system 24: GOP start signal and track start signal. Since it is determined beforehand that there are 12 slant tracks per one GOP in the audio and video data of the 625/50 format, and 10 slant tracks in the audio and video data of the 525/60 format, a track number may be generated for each track in a GOP based on the received GOP start signal, track start signal and the predetermined number of tracks in the GOP. As shown in FIG. 1, the GOP start signal and track start signal are produced by the drum/capstan servo system 24 from the GOP signal of the GOP generator 14. In addition, based on a drum pulse generating (PG) signal and the GOP signal, the drum/capstan servo system 24 generates a drum/capstan drive signal to control rotation of the drum and transport of the tape. Note that it is assumed that the data content differs for every GOP sequence.

Continuing with the description of FIG. 1, the inner ECC encoder 34 adds an inner code (see also FIG. 3) to the audio and video data supplied from the ID adder 32. The inner ECC encoder 34 further performs the appropriate processing of the signal, such as parallel-to-serial conversion, modulation and amplification to generate a recording signal suitable for recording on the tape. The resulting signal is then output to a recording head 36 for an actual recording operation on a tape 40.

Note that the error control codes added to the audio and video data by the outer ECC encoder 26 and the inner ECC encoder 34 take the form of a product code as shown in FIG. 3. This enables reproduction of audio and video data even when as much as one slant track of data on the tape 40 is lost for every GOP.

The recording head 36 includes the positive azimuth heads and the negative azimuth heads. The positive azimuth heads and the negative azimuth heads alternately invert the azimuth angles of the recording signals, input from the inner ECC encoder 34, for every slant track. As a result, the audio and video data for one GOP may be contained in 12 slant tracks in the audio and video data of the 625/50 format, or 10 slant tracks in the audio and video data of the 525/60 format. Finally, the recording signals with alternating azimuth angles are recorded on the slant tracks. Substantially simultaneously with the recording of the audio and video data, a control signal generated by the drum/capstan servo system 24 is recorded on a longitudinal track of the tape by a recording control head 38 to provide a tracking control in the VTR.

As a result of the recording operation of the apparatus as described above, audio and video data placed into an appropriate recording format is recorded on the slant tracks of the tape, while the control signal is recorded on the longitudinal track of the same tape.

Next, a reproducing operation of the apparatus will be described for a VTR with the non-tracking control system with reference to FIG. 2. A drum rotation system (not shown) rotates the drum according to a drum drive signal from the drum/capstan servo system 24. A capstan 46 generates a capstan signal and outputs it to the drum/capstan servo system 24. Furthermore, the capstan 46 controls the transport of the tape based on the capstan drive signal from the drum/capstan servo system 24.

Figure 5:
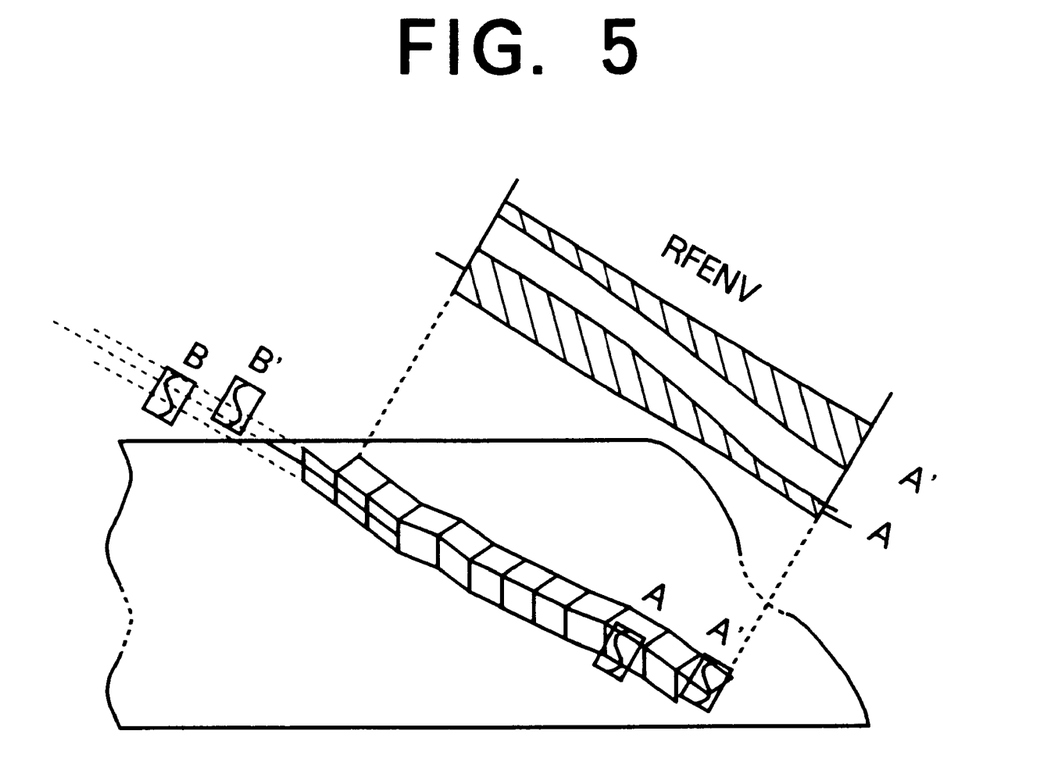
FIG. 5 is a diagram of non-tracking control with positive azimuth heads tracing the slant tracks of a tape in which deformation has occurred.

During data reproduction, the positive azimuth heads and negative azimuth heads of the playback head 68 read the data recorded on the tape 40. This non-tracking control will be further explained. For example, as shown in FIG. 5, when the positive azimuth heads A and A' trace the slant tracks with the positive azimuth angle on the tape in which deformation has occurred, the obtained audio and video data read by the positive azimuth heads is indicated as A and A' in RF envelope. By tracing the tape 40 with the two heads having an interval of one track pitch, the audio and video data can be read even if each head does not precisely trace the slant track. By the way, the negative azimuth heads B and B' cannot read the audio and video data from the slant tracks containing the positive azimuth data.

Figure 2:
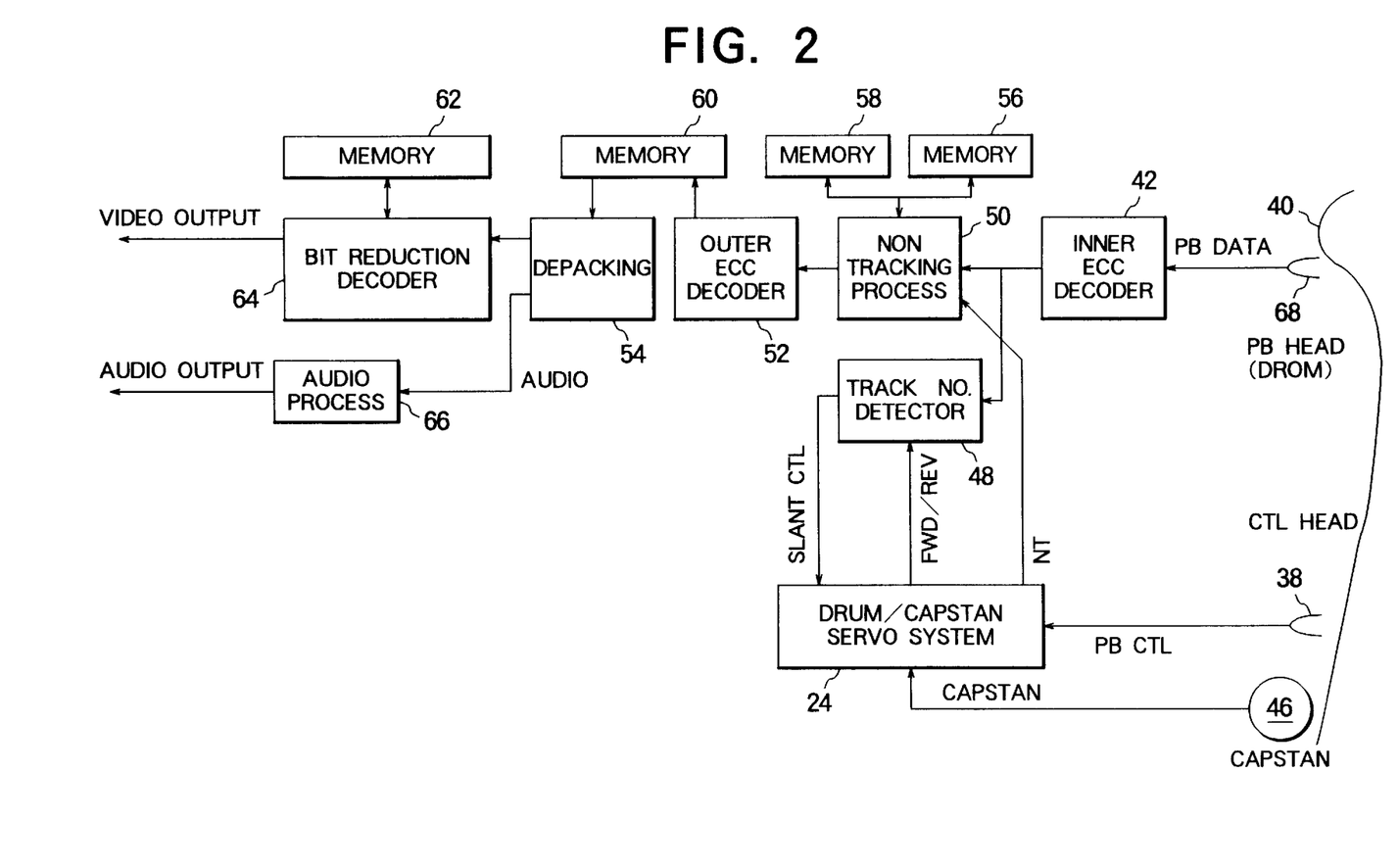
FIG. 2 is a block diagram of the recording and reproducing apparatus according to the present invention during a playback (reproducing) operation.

Continuing with the description of FIG. 2, after the data is obtained by the playback head 68, it is output to an inner ECC decoder 42. The inner ECC decoder 42 performs an error detection and correction operation on the audio and video data using the inner code added by the inner ECC encoder 34 of FIG. 1 during the recording operation. The error corrected data is then supplied to a non-tracking processor 50 and track number detector 48.

As explained above, two different sets of data are obtained from the playback head 68 due to a pair of same-azimuth heads scanning at the same time. The non-tracking processor 50 assigns a higher priority to the audio and video data having the least number of errors based on the error rate signal from the inner ECC decoder 42. Subsequently, the non-tracking processor 50 accesses, via the write enable signal, the memory 56, 58 to store the audio and video data with the assigned priority. In addition, audio and video data from two slant tracks before and after each GOP is also stored in the memory 56, 58 so that the correct reproduction is possible even when the phase (tracking) corresponding to the control track of the tape is greatly deviated from the correct position.

After the processing by the non-tracking processor 50, an outer ECC decoder 52 performs the error correction on the audio and video data Using the outer codes recorded by the outer ECC encoder 26 of FIG. 1 during the recording operation. The audio and video data having the least number of errors is then stored into a memory 60. Based on a control signal from the system controller 18 of FIG. 1, the memory 60 realizes a so-called shuffle operation of outputting the audio and video data to a depacking circuit 54. The depacking circuit 54 separates the audio data from video data and outputs an audio data stream to an audio processor 66 and a video data stream to a bit reduction decoder 64. Similar to the reverse processing during the recording stage, the audio processor 66 may perform the expanding and decoding operation or delay processing on the audio data received from the depacking circuit 54. Using a memory 62, the bit reduction decoder 64 expands the compressed video data in a substantially reverse operation to the bit reduction encoder 10 of FIG. 1. The audio and video data is subsequently output to various external sources.

Referring to the lower portion of FIG. 2, the control head (CTL HEAD) 38 reads the playback control signal (PB CTL) from the longitudinal track of the tape 40 during the reproduction of the audio and video data and supplies the signal to the drum/capstan servo system 24. The drum/capstan servo system 24 receives and processes the playback control signal and the capstan signal during the normal reproduction. Alternatively, the playback control signal may be replaced by the slant signal to control the tape transport. That is, the slant signal and capstan signal are processed when head clogging is caused in the playback control head 38 such that the control signal cannot be reproduced. Based on these input signals depending on circumstances during the reproduction, the drum/capstan servo system 24 generates a forward/reverse (FWD/REV) signal and non-tracking (NT) signal. The NT signal provides timing pulses for the non-tracking processor 50.

The track identification (ID) data will now be described in detail. The track number detector 48 selects the track number data (TRACK ID) from the audio and video data after the error correction by the inner ECC decoder 42 is carried out. Further, the track number detector 48 generates the slant control signal (slant CTL) based on the previously obtained track number data (TRACK ID) and the FWD/REV signal supplied from the drum/capstan servo system 24. The slant control signal is output to the drum/capstan servo system 24 for controlling the tape transport.

FIG. 4 shows a detailed configuration of the ID data contained within the synchronization block (SYNC BLOCK) of FIG. 3. With reference to FIG. 4, the second through fifth bytes (counting 0th byte as the origin) of the synchronization block are used as the track ID data. The 0th byte (ID0) of the track ID data is used as data for identifying the synchronization block (SYNC BLOCK). The first byte (ID1) of the track ID data is used for indicating the distinction between the audio data and video data (VIDEO/AUDIO ID). The first byte (ID1) also has the track number (TRACK ID0–3) indicating the order of the slant tracks in a GOP on the tape having the synchronization block (SYNC BLOCK) recorded thereon. The second byte (ID2) of the track ID data is used as the 0th through 7th bits of the history data (HISTORICAL ID0–7) for storing the history of editing, etc. The third byte (ID3) of the track ID data is used as the data (CYCLIC ID0–2) indicating the eighth and ninth bits of the history data (HISTORICAL ID) and the order of GOP.

Figure 6:
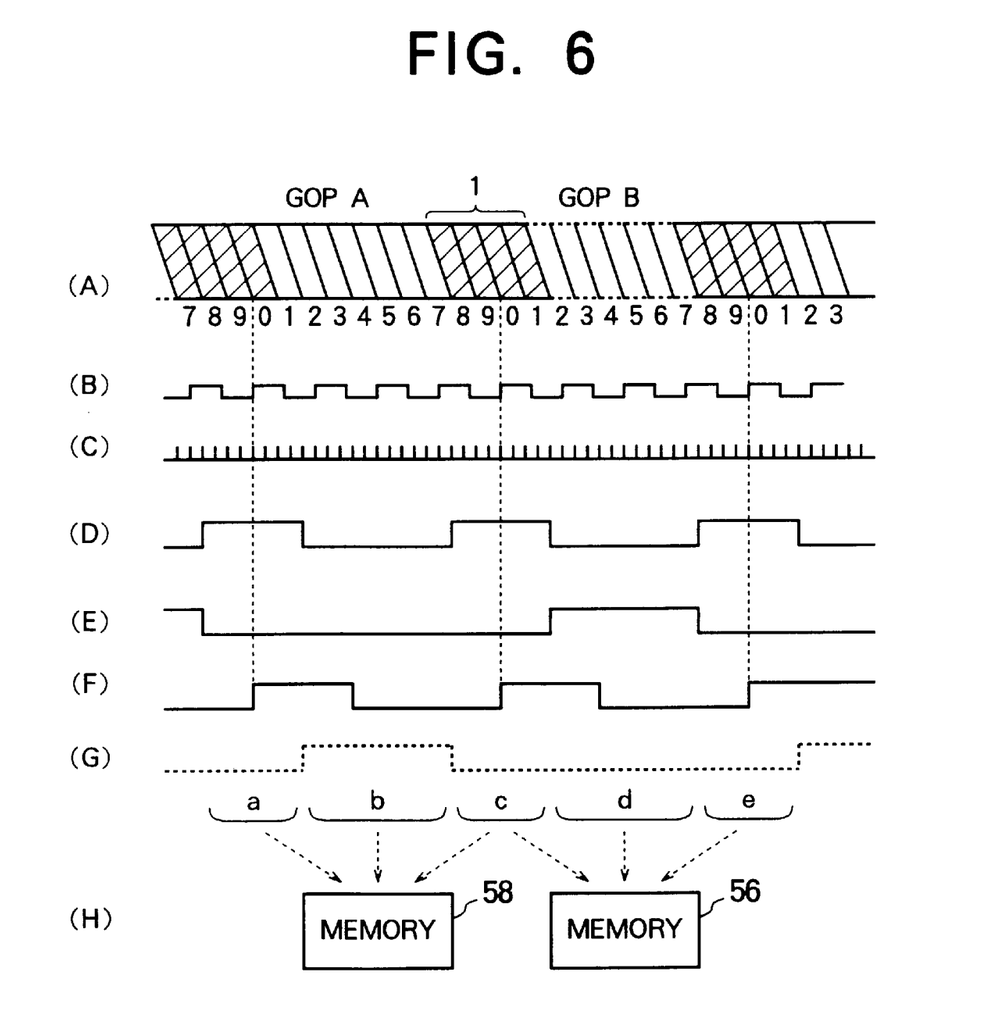
FIG. 6 is a timing diagram of the operation of the recording and reproducing apparatus during data reproduction according to the present invention.

FIG. 6 is a timing diagram showing the operation of the recording and reproducing apparatus of the present invention during audio and video data reproduction. In FIG. 6, diagram (A) indicates audio and video data recorded on the slant tracks of the tape along with the corresponding track numbers within each GOP. Diagram (B) shows the playback control signal (PB CTL) reproduced from the longitudinal track of the tape. Diagram (C) indicates a capstan signal output from the capstan 46. Diagram (D) shows the non-tracking (NT) signal for providing timing for the non-tracking processor 50. Diagram (E) indicates the slant control signal (slant CTL) generated by the track number generator 28. Diagram (F) illustrates the write enable signal for accessing the memory 58, while diagram (G) indicates the write enable signal for accessing the memory 56. Diagram (H) shows both the memory 58 and 56. As apparent from diagrams (F), (G) and (H), the audio and video data at the boundaries of GOP is stored in each memory 58, 56. The write enable signals are active while the signal is low.

As shown in FIG. 6, at the boundaries of GOP A and GOP B (hatched tracks 8, 9, 0, 1) of the audio and video data recorded on the slant tracks, during the data reproduction, there is a possibility that the audio and video data (upper data) of GOP A and GOP B will be reproduced mixed or the audio and video data (underlying data), which has been already recorded before recording these GOPs, will be reproduced. To prevent this from occurring, the non-tracking processor 50 activates the write enable signal for each memory 58, 56 to store the GOP A and GOP B (hatched track data) in two storage areas. The audio and video data of the tracks 8 and 9 of the previous GOP, the tracks 0–9 of the GOP A, and the tracks 0 and 1 of the GOP B is stored in the memory 58, while the audio and video data of the tracks 8 and 9 of the GOP A, the tracks 0–9 of the GOP B, and the tracks 0 and 1 of the next GOP is stored in the memory 56. That is, the non-tracking processor 50 stores the audio and video data at the boundaries of the GOP in an overlapped manner as shown in FIG. 6.

Figure 7:
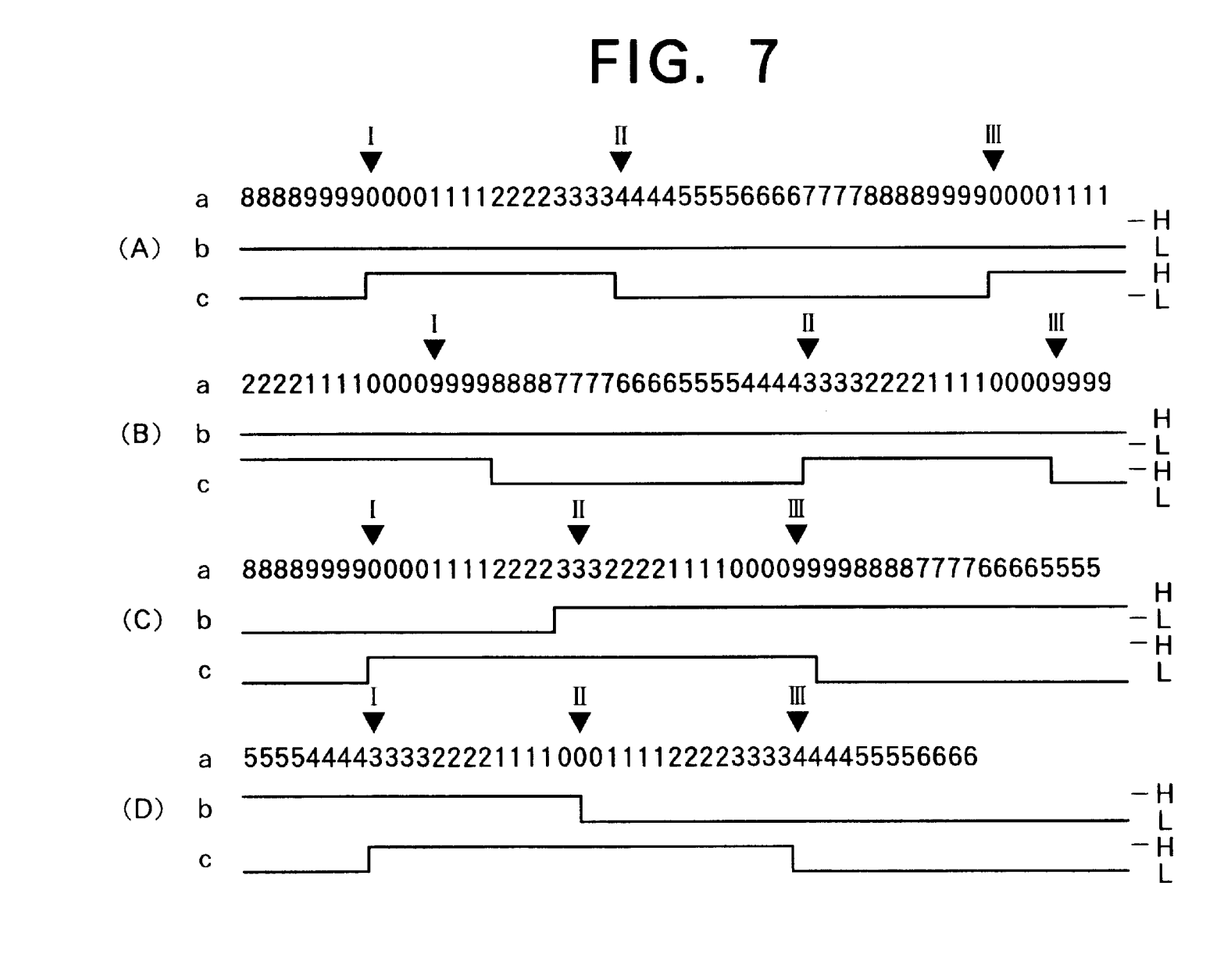
FIG. 7 is a diagram of a slant track control signal as a function of the forward/reverse reproduction and track numbers within each GOP.

FIG. 7 is a diagram of a slant track control signal as a function of the forward/reverse direction during reproduction and track numbers within each GOP. in particular, FIG. 7 shows the slant control signal (slant CTL) generated by the track number detector 48 of FIG. 2, in which signal a indicates the track number data (TRACK ID), signal b indicates the logical value of the FWD/REV signal input to the track number detector 48 from the drum/capstan servo system 24, and signal c indicates the slant control signal (slant CTL). Diagram (A) of FIG. 7 indicates the slant control signal during data reproduction in the forward direction (FWD). Diagram (B) shows the slant control signal during data reproduction in the reverse direction (REV). Diagram (C) indicates the slant control signal when data reproduction direction is changed from the forward direction to the reverse direction, while diagram (D) illustrates the slant control signal when the data reproduction is changed from the reverse direction to the forward direction.

As shown in FIG. 7, in one embodiment of the invention, the track number detector 48 generates the high-level slant control signal (signal c) when the value of the detected track number data (TRACK ID), as represented by signal a, changes from 9 to 0 during the reproduction in the forward direction. A low-level slant control signal is generated when TRACK ID changes from 3 to 4 during the reproduction in the forward direction. The slant control signal falls when the value of the detected track number (TRACK ID), as represented by signal a, changes from 0 to 9 and rises when the value of the detected track number (TRACK ID) changes from 4 to 3 during the reproduction in the reverse direction. As described above, the slant control signal is based on the track number data (TRACK ID), selected from the audio and video error-corrected data and the FWD/REV signal. The FWD/REV signal is supplied from the drum/capstan servo system 24 and indicates whether the reproduction of the forward or reverse direction is carried out based on the logical values 0 (low) and 1 (high), respectively.

It is worth noting that the slant control signal based on track ID data can be used in a recording and reproducing apparatus without the non-tracking system.

Furthermore, the above-described elements of the recording and reproducing apparatus may be implemented in hardware or software without limiting the function and operation of the components and/or apparatus of the present invention.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An apparatus for recording audio/video data on a tape having a plurality of slant tracks and a longitudinal track, comprising:

means for compressing and coding the audio/video data to produce encoded audio/video data;

an ID generator for generating track identification (ID) data added to the encoded audio/video data to control a transport of said tape such that the track ID data corresponds to respective slant tracks on said tape;

a data unit generator for forming the encoded audio/video data into a plurality of data units wherein each data unit includes multiple slant tracks;

means for generating a control signal to indicate a start of each data unit;

a track number generator for generating a track number for each slant track of a respective data unit based on said control signal, said track number generator supplying the generated track numbers to said ID generator to be included in the track ID data, wherein the track numbers in one data unit are identical to the track numbers in another data unit;

means for generating an error correction code which is added to the encoded audio/video data with the track ID data to produce recordable audio/video data;

means for recording the recordable audio/video data on said slant tracks; and means for generating a control signal recorded on said longitudinal track to control the transport of said tape.

2. An apparatus according to claim 1, further comprising bit-reduction means for compressing the audio/video data, and wherein each respective data unit is a group of pictures (GOP).

3. An apparatus according to claim 1, wherein said recording means includes at least two recording heads with different azimuth angles for recording on adjacent slant tracks of said tape.

4. An apparatus for reproducing from a tape audio/video data recorded on a plurality of slant tracks and for reproducing a control signal recorded on a longitudinal track of said tape during a recording operation, said audio/video data having been formed into a plurality of data units, each data unit including multiple slant tracks and a track number having been included in track identification (ID) data for each slant track of a data unit, said apparatus comprising:

means for reproducing encoded audio/video data and the track ID data from said slant tracks, wherein the track ID data corresponds to respective slant tracks;

means for correcting errors in the encoded audio/video data using an error control code added to the encoded audio/video data during the recording operation;

means for detecting the track number in the encoded audio/video data;

means for reproducing the control signal from said longitudinal track; and means for controlling a transport of said tape as a function of one of the control signal and track ID data, wherein the transport of said tape is controlled as a function of the track numbers included in the track ID data if said control signal cannot be reproduced from said longitudinal track.

5. An apparatus according to claim 4, wherein said reproducing means comprises at least two playback heads with different azimuth angles scanning adjacent slant tracks of said tape.

6. An apparatus according to claim 4, wherein said reproducing means comprises two pairs of playback heads with one pair having a different azimuth angle than the other pair for substantially simultaneously scanning adjacent slant tracks of said tape.

7. An apparatus according to claim 6, wherein each pair produces two data units corresponding to one slant track in said plurality of slant tracks.

8. An apparatus according to claim 7, further comprising means for selecting from said two data units one data unit with the least number of errors after being error-corrected to subsequently output said one data unit as the audio/video data for said one slant track.

9. An apparatus for recording and reproducing audio/video data on a tape having a plurality of slant tracks and a longitudinal track, comprising:

means for compressing and coding the audio/video data to produce encoded audio/video data;

an ID generator for generating track identification (ID) data added to the encoded audio/video data to control a transport of said tape such that the track ID data corresponds to respective slant tracks on said tape;

a data unit generator for forming the encoded audio/video data into a plurality of data units wherein each data unit includes multiple slant tracks;

means for generating a signal to indicate a start of each data unit;

a track number generator for generating a track number for each slant track of a respective data unit based on said control signal, said track number generator supplying the generated track numbers to said ID generator to be included in the track ID data, wherein the track numbers in one data unit are identical to the track numbers in another data unit;

means for generating an error correction code which is added to the encoded audio/video data with the track ID data to produce recordable audio/video data;

means for recording the recordable audio/video data on said slant tracks;

means for generating a control signal recorded on said longitudinal track to control the transport of said tape;

means for reproducing the encoded audio/video data and track ID data from said slant tracks;

means for correcting errors in the encoded audio/video data using the error control code;

means for detecting the track number in the encoded audio/video data;

means for reproducing the control signal from said longitudinal track; and means for controlling the transport of said tape as a function of one of the control signal and track ID data, wherein the transport of said tape is controlled as a function of the track numbers included in the track ID data if said control signal cannot be reproduced from said longitudinal track.

10. An apparatus according to claim 9, wherein each data unit in said plurality of data units is a group of pictures (GOP).

11. A method for recording audio/video data on a tape having a plurality of slant tracks and a longitudinal track, said method comprising the steps of:

compressing and coding the audio/video data to produce encoded audio/video data;

generating track identification (ID) data to control a transport of said tape;

adding the track ID data to the encoded audio/video data such that the track ID data corresponds to respective slant tracks on said tape;

forming the encoded audio/video data into a plurality of data units wherein each data unit includes multiple slant tracks;

generating a control signal to indicate a start of each data unit;

generating a track number for each slant track of a respective data unit based on said control signal, the generated track numbers being included in the track ID data, wherein the track numbers in one data unit are identical to the track numbers in another data unit;

generating an error correction code which is added to the encoded audio/video data with the track ID data to produce recordable audio/video data;

recording the recordable audio/video data on said slant tracks;

generating a control signal to control the transport of said tape; and recording the control signal on said longitudinal track.

12. A method for reproducing from a tape audio/video data recorded on a plurality of slant tracks and for reproducing a control signal recorded on a longitudinal track of said tape during a recording operation, said audio/video data having been formed into a plurality of data units, each data unit including multiple slant tracks and a track number having been included in track identification (ID) data for each slant track of a data unit, said method comprising the steps of:

reproducing encoded audio/video data and track identification (ID) data from said slant tracks, wherein the track ID data corresponds to respective slant tracks on said tape and is added to the encoded audio/video data during the recording operation;

correcting errors in the encoded audio/video data using an error control code added to the encoded audio/video data during the recording operation;

detecting the track number in the encoded audio/video data;

reproducing the control signal from said longitudinal track; and controlling a transport of said tape as a function of one of the control signal and track ID data, wherein the transport of said tape is controlled as a function of the track numbers included in the track ID data if said control signal cannot be reproduced from said longitudinal track.

13. A method for recording and reproducing audio/video data on a tape having a plurality of slant tracks and a longitudinal track, said method comprising the steps of:

compressing and coding the audio/video data to produce encoded audio/video data;

generating track identification (ID) data added to the encoded audio/video data to control a transport of said tape such that the track ID data corresponds to respective slant tracks on said tape;

forming the encoded audio/video data into a plurality of data units wherein each data unit includes multiple slant tracks;

generating a control signal to indicate a start of each data unit;

generating a track number for each slant track of a respective data unit based on said control signal, the generated track numbers being included in the track ID data, wherein the track numbers in one data unit are identical to the track numbers in another data unit;

generating an error correction code which is added to the encoded audio/video data with the track ID data to produce recordable audio/video data;

recording the recordable audio/video data on said slant tracks;

generating a control signal recorded on said longitudinal track to control the transport of said tape;

reproducing the encoded audio/video data and track ID data from said slant tracks;

correcting errors in the encoded audio/video data using the error control code;

detecting the track number in the encoded audio/video data;

reproducing the control signal from said longitudinal track; and controlling a transport of said tape as a function of one of the control signal and track ID data, wherein the transport of said tape is controlled as a function of the track numbers included in the track ID data if said control signal cannot be reproduced from said longitudinal track.

* * * * *